Patented July 27, 1948

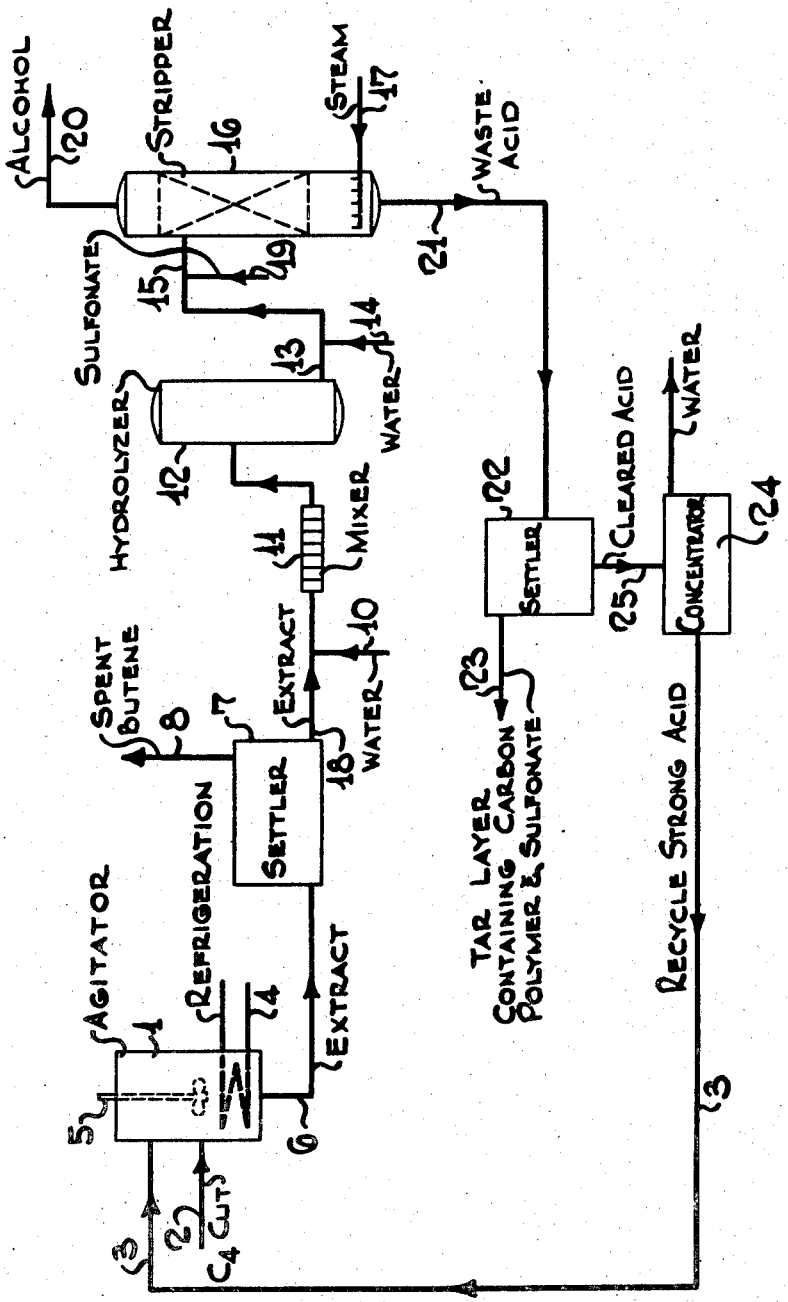

2,446,159

UNITED STATES PATENT OFFICE 2,446,159

DISTILLATION OF ALCOHOL FROM HYDROLYZED MIXTURES OF ALKYL SULFATES AND SULFURIC ACID

Henry O. Mottern, Hillside, and Francis M. Archibald, Elizabeth, N. J., assignors, by mesne assignments, to Standard Oil Development Company, a corporation of Delaware Application November 10, 1944, Serial No. 562,880

3 Claims. (Cl. 202—57)

The present invention relates to the production of alcohols from olefins occurring in cracked petroleum material.

In the manufacture of alcohols from various olefinic materials, the olefins are absorbed in sulfuric acid to form the alkyl esters which remain in the acid as an acid extract. The extract is diluted with water to hydrolyze the esters to the corresponding alcohols which are recovered by distillation from the extract. During the absorption of the olefins in the sulfuric acid, particularly when the acid has a concentration of 83% or more, a portion of the olefins oxidize and polymerize to form higher molecular weight materials which upon dilution with water separate out as tarry material consisting of oily polymers of solid compounds such as resin acids. Under more extreme conditions these impurities are oxidized to a flocculent carbon. These tars, resins and carbon particles cause considerable difficulties in recovering the alcohol from the sulfuric acid extracts. When the acid remaining from the distillation of alcohols is reconcentrated and reused to absorb further amounts of olefins, the tendency of the tars and resins to carbonize and form flocculent carbon upon dilulution is greatly increased. The carbon, on reabsorption of the olefins in the restored acid, becomes mixed with the tars and resins during the alcohol recovery step and causes much delay and expense in the recovery of the alcohol by collecting in the still in sufficient quantity to require shutdown in order to clean out the distillation equipment. Cleaning of the stills is tedious and time-consuming and in some cases requires the use of expensive solvents to break up the tarry and resinous mass.

It is therefore one object of the invention to prevent the deposit of such tarry and carbonaceous materials in the still during the distillation of the alcohol from the extract.

It is a further object of this invention to provide a process for the production of alcohols from acid extracts in a continuous manner without any periodic shutdown to clean out the still.

Other objects and a fuller understanding of this invention may be had by referring to the following description and claims taken in conjunction with the accompanying drawing which is a diagrammatic view of the general flow plan of the process.

According to the present invention, the above objects are accomplished by adding small amounts of sulfonates or sulfonated compounds to the acid extracts fed to the distillation equipment either before or after dilution and hydrolysis with water. The addition of such sulfonated compounds in smaller quantities causes dispersion of the tars, resins, carbon particles, etc., into fine particles which do not coagulate on the wetted surfaces within the still. Thus the recovery of the alcohol by distillation can be continued indefinitely by the use of such sulfonated materials. Sulfonated material or sulfonates may be added either to the strong acid extracts prior to dilution for hydrolysis or to the diluted extract or to the diluted and hydrolyzed extract prior to counter-current steam distillation. The point of addition is a matter of convenience in operating the alcohol recovery equipment.

Referring more particularly to the drawing, a hydrocarbon feed stock consisting primarily of hydrocarbons of four carbon atoms and containing about 15–90% olefins is introduced into agitator 1 through line 2. Sulfuric acid of about 80–90% strength is introduced by line 3 into agitator 1 at a point above the introduction of the olefins. A temperature of 25–50° C. is maintained in agitator 1 by means of refrigeration coil 4. In the agitator the acid and the olefins are thoroughly contacted by means of agitator blade 5, whereupon the olefins are absorbed in the sulfuric acid, forming an acid extract which is removed from the bottom of agitator 1 through line 6. The acid extract removed from the bottom of absorber 1 by line 6 is introduced into settler 7 from which unabsorbed olefins are removed through line 8. The extract free of unabsorbed hydrocarbons is removed from settler 7 through line 9 and diluted with water introduced through line 10 to an acid strength of 65–75%, on a hydrocarbon-free basis. The extract and water are then passed through mixer 11 to hydrolyzer 12 at a temperature of 50–80° C. Diluted acid extract containing mono-alkyl sulfates and alcohol is then passed from the bottom of the hydrolyzer through line 13 and additional water is introduced through line 14 to reduce the acid concentration to about 45%, on a hydrocarbon-free basis. The dilute extract is then passed by line 15 and introduced into the top of stripping tower 16 where butyl alcohol is stripped from the extract by the countercurrent action of steam introduced through line 17. By virtue of the dilution with water introduced through line 14 in the usual process of operation and the removal of the alcohols and other volatile oils by steam distillation any polymers, tars, resins or carbonaceous material present are precipitated and clog up the plates of the column 16 and after a time result in the necessity of shutting down the process in order to clean out the still. However, according to this invention 1-2 vol. percent of a sulfonate or sulfonated material based on the acid extract leaving agitator 1 is introduced either through line 18 just prior to the introduction of the water or through line 19 just prior to the introduction of the acid extract into the top of the stripping tower. The addition of small amounts of this sulfonated material results in dispersing the tarry, resinous and carbonaceous material so that it does not agglomerate and clog up the plates of the still. Alcohol is removed from the top of tower 16 through line 20 and passed to storage as crude alcohol awaiting subsequent finishing operations. Acid extract from which all alcohol has been removed and which still contains the added sulfonates is removed from the stripping still through line 21. This spent acid is passed to settler 22 to remove the layer of sulfonates containing polymer, resins, carbon, etc., which is drawn off through line 23. Purified acid is then passed to concentrator 24 through line 25 where it is reconcentrated to 80-90% concentration and recycled to the top of absorber 1 through line 3 as the acid used for the absorption of olefins.

The sulfonated compounds found to be most effective for the dispersion of the tars, resins and carbonaceous materials according to the present invention are the oil-soluble sulfonates obtained in preparing white oil by treating lubricating oil distillates having an average molecular weight of about 300, crude hydroxy octyl sulfonates, such as those recovered from waste acids obtained in the manufacture of various alcohols, the water-soluble sulfonates obtained from sulfuric-acid-oil sludges, and various aromatic and aliphatic sulfonates or sulfonic acids. The sulfonates are preferably added in amounts between 0.5 and 2 vol. percent based on the strong acid extract leaving the agitator.

The present invention may be illustrated by the following examples, which are not to be considered as limiting the invention:

Example 1

An acid extract prepared from 88% $H_2SO_4$ and n-butenes by the commercial scale plant was diluted to 45% $H_2SO_4$ (hydrocarbon-free basis) with water. This extract was fed to a bead packed glass column of 1" diameter by 48" length, in which the alcohol was recovered by steam distillation with steam countercurrent to the acid stream. When 6000 cc. of the strong acid extract or 10,230 cc. of the diluted extract had been steam stripped the stripping column became plugged so that no more could be fed. The acid was recovered with no tar separating, indicating its deposition in the column. It was later recovered from the column.

Example 2

The same extract as used for Example 1 had added to it 2 vol. percent of hydroxy octyl sulfonate. It was then diluted and steam distilled as previously described. After 10,230 cc. of dilute extract had been stripped the feed rate of extract had not decreased from the initial rate of 1,200 cc./hr.

Example 3

The above was repeated using a water-soluble sulfonate sludge recovered from the fuming $H_2SO_4$ treatment of a lubricating oil distillate. The same effect on cleanliness of the still was noted. The concentration required was 1-2 vol. percent of the strong acid extract.

Example 4

The above was repeated using the oil-soluble sulfonate recovered as a by-product soap from white oil manufacture. The oil-soluble sulfonate in 1-2 vol. percent concentration of the strong acid extract was effective for dispersion of the tar as shown above.

Although this invention has been described in connection with the preparation of butyl alcohols, it is understood that the present disclosure has been made by way of example only and that numerous changes in the details may be resorted to without departing from the spirit and scope of the invention as hereinafter claimed. For example the invention may be applied to the manufacture of ethyl alcohol, isopropyl alcohol, amyl alcohol or other higher alcohols.

The nature and objects of the present invention having thus been set forth and the specific examples of the same given, what is claimed as new and useful and desired to be secured by Letters Patent is:

1. In a process for recovering alcohol from a hydrolized mixture of alkyl sulfates and sulfuric acid by distillation to remove alcohol from the hydrolyzed mixture, the improvement which comprises carrying out such distillation in the presence of a small amount of an oil soluble sulfonate recovered as a by-product from white oil manufacture.

2. A process according to claim 1 in which the sulfonate is present in the amount of between 0.5 and 2 percent by volume of the mixture of alkyl sulfates and sulfuric acid prior to hydrolysis.

3. In a process for recovering alcohol from a hydrolyzed mixture of alkyl sulfates and sulfuric acid by distillation to remove alcohol from the hydrolyzed mixture, the improvement which comprises carrying out such distillation in the presence of a small amount of sulfonate recovered as a by-product in the sulfuric acid treatment of lubricating oils in white oil manufacture.

HENRY O. MOTTERN.
FRANCIS M. ARCHIBALD.

REFERENCES CITED

The following references are of record in the file of this patent:

UNITED STATES PATENTS

| Number | Name | Date |
| --- | --- | --- |
| 625,108 | Hewitt | May 16, 1899 |
| 2,080,064 | Roelfsema | May 11, 1937 |